5803X
A. Lamont,
Screw Dies and Taps,
Patented Jan. 29, 1830.
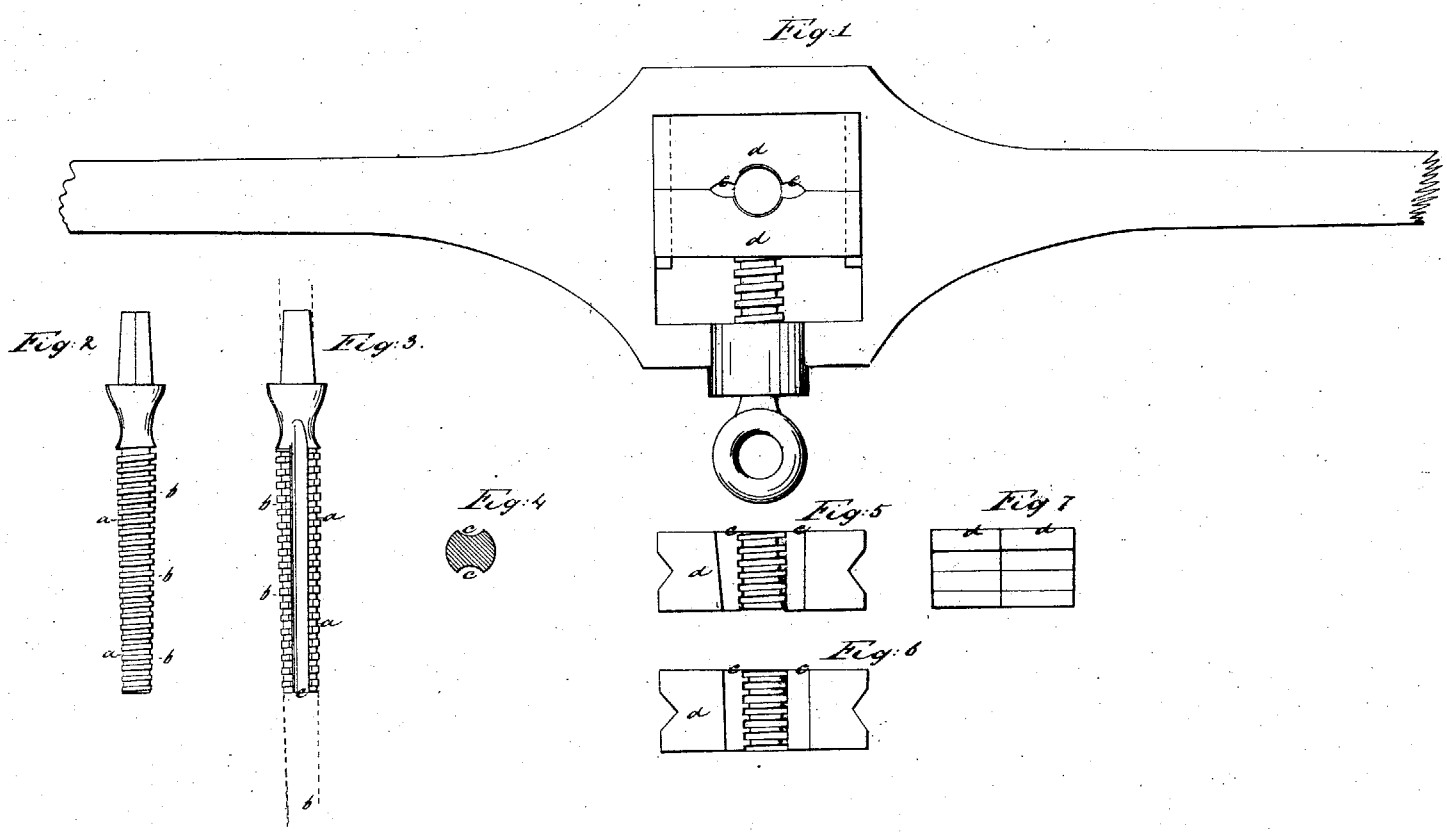

X5803 Jan 29 1831 947.

Archibald Lamont Jan. 29, 1830

Letters Patent.

The Schedule referred to in these Letters Patent and making part of
the same containing a description in the words of the said Archibald La-
mont himself of his improvement in Taps and dies The following is a description of Taps and dies for cutting screws of all
kinds with the thread either square round or mitred, either by Hand, steam
or water power, or power of any other description used to drive machinery.
1st Specification of the Tap - The body or solid part of the Tap is of
uniform or equal size from end to end. The spiral thread or cutters only
are tapered with two deep grooves opposite each other, and running the whole
length of the Tap. The cutters or spiral thread beginning at nothing or
the plane surface and gradually rising up to ~~the~~ full size in such manner
that each cutter makes a regular cut, the chip being deposited in one or
other of the grooves until it passes off.
2nd Specification of the Dies - The cavity in the Dies by which
the screw is made forms an entire and complete circle having two [illegible]
[illegible] openings across the centre of the Dies which form the cutters,
and also permit the chip to pass off. The screw in the dies also com-
mences at nothing or a plane surface and gradually increases until
the thread acquires the full size Witnesses
Robt Christy
Thomas Liggett Archibald Lamont Exd.
[illegible]

240 Words)